United States Patent [19]

Mollard

[11] 4,018,874

[45] Apr. 19, 1977

[54] PROCESS FOR THE PRODUCTION OF SODIUM PERCARBONATE BY ATOMIZATION

[75] Inventor: Paul Mollard, Sainte Foy Les Lyon, France

[73] Assignee: Produits Chimiques Ugine Kuhlmann, Paris, France

[22] Filed: Aug. 15, 1974

[21] Appl. No.: 497,537

[30] Foreign Application Priority Data

Aug. 28, 1973 France .............................. 73.31041

[52] U.S. Cl. ............................................. 423/415 P
[51] Int. Cl.² ......................................... C01B 15/10
[58] Field of Search ................. 423/415, 415 P, 419

[56] References Cited
UNITED STATES PATENTS

| 2,167,997 | 8/1939 | Reichert | 423/415 |
| 2,541,733 | 2/1951 | Young | 423/415 P |
| 3,463,618 | 8/1969 | Harris et al. | 423/415 |

FOREIGN PATENTS OR APPLICATIONS 141,853  10/1960  U.S.S.R. .......................... 423/415 P

*Primary Examiner*—Earl C. Thomas
*Attorney, Agent, or Firm*—Brooks, Haidt, Haffner & Delahunty

[57] ABSTRACT

Processes for the preparation of alkali metal percarbonate which comprise separately spraying into a reaction chamber a hot aqueous solution of sodium hydroxide and an aqueous solution of hydrogen peroxide and introducing a hot gas containing air and carbon dioxide to obtain sodium percarbonate, the product having a mean particle diameter between 0.1 and 0.5 mm, an apparent density between 0.2 and 1 g/cm³, and an active oxygen content between 7 and 15.3 percent, the sodium percarbonate being particularly adapted for use in domestic laundry products.

10 Claims, 1 Drawing Figure

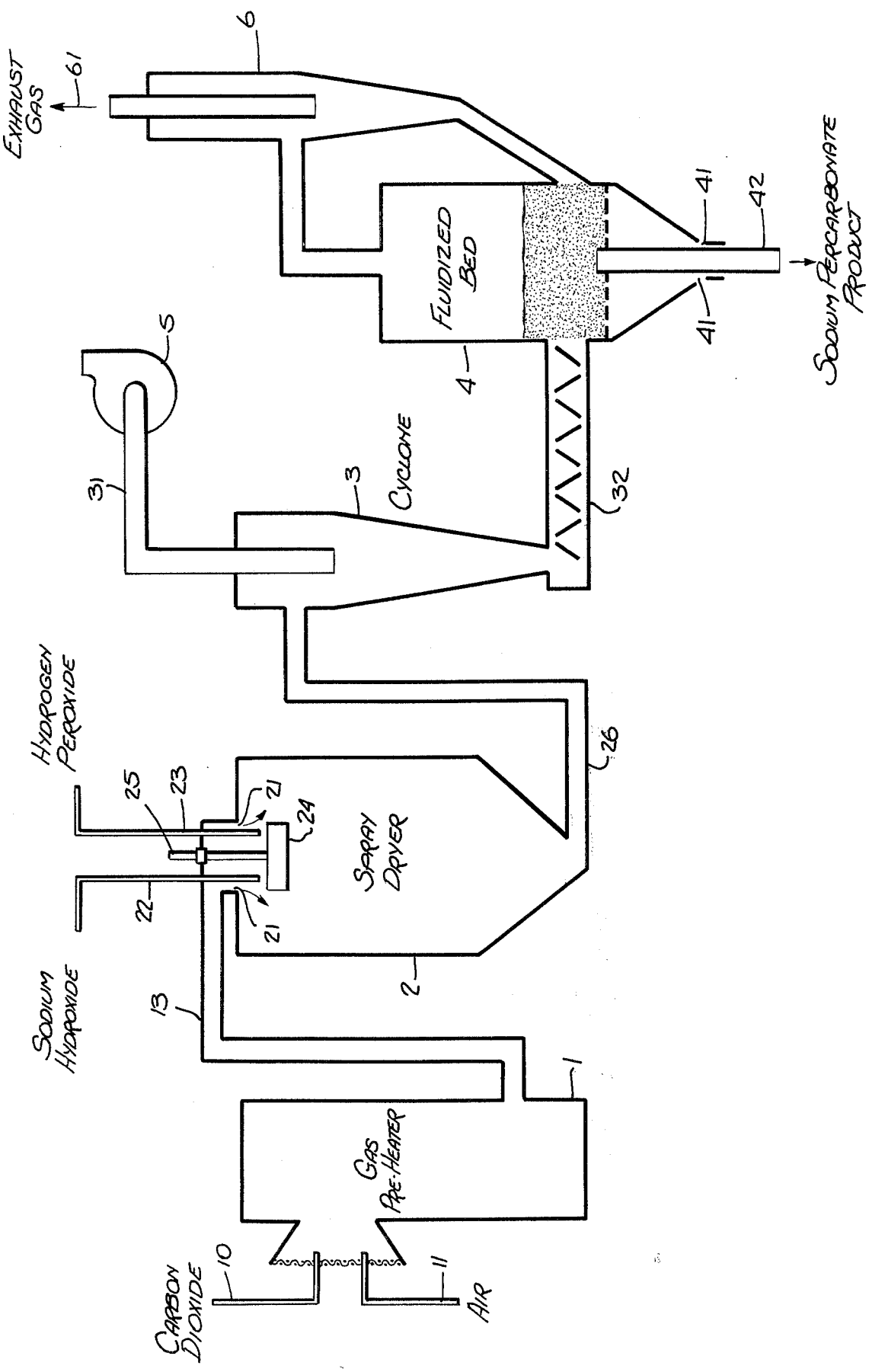

PROCESS FOR THE PRODUCTION OF SODIUM PERCARBONATE BY ATOMIZATION

BACKGROUND OF THE INVENTION

The present invention relates to the preparation of alkali metal percarbonates and more specifically to processes for producing sodium percarbonate by spraying.

Sodium percarbonate is frequently used in laundry washing and detergent compositions, bleaching agents, and in scouring powders. According to the prior art techniques, the percarbonate is produced by chilling a mixture of concentrated aqueous hydrogen peroxide and saturated sodium carbonate solution to precipitate the product. After draining and drying, a product having the formula $Na_2CO_3.1.5 H_2O_2$ and containing about 15.4 percent active oxygen is obtained.

With this process, the mother liquor of crystallization contains substantial active oxygen values and must be recycled for economic reasons. But such recycling cannot be completely effective because of the well-known instability of hydrogen peroxide, and in practice on the order of 15 to 20 percent of the active oxygen is lost. This instability is a result of the presence of the inevitable impurities, principally iron, in the commercial sodium carbonate starting material, and the recycling naturally increases the concentration of such impurities.

Incidentally, as mentioned above, sodium percarbonate is frequently included in laundry compositions, bleaching agents, and scouring powders, but the components of such cleaning agents, other than percarbonate, are very different, both in their form and their density, from particles of sodium percarbonate prepared by prior art process, and this makes it very difficult to obtain a homogeneous mixture.

It would be commercially desirable to be able to prepare sodium percarbonate by spraying. Various suggestions have been made along these lines, as in the French patent application of Degussa, No. 69/27886, filed Aug. 13, 1969. The claimed Degussa procedure contemplates spraying sodium percarbonate already prepared before it is introduced into the spray drying tower. This is, in fact, really a spray drying of the sodium percarbonate.

THE INVENTION

Briefly, the present invention contemplates a process for the preparation of alkali percarbonate by spraying, in which an aqueous solution of soda (caustic) and an aqueous solution of hydrogen peroxide are separately sprayed into a reaction vessel and there is separately introduced a gas comprising hot air containing hot carbon dioxide. It will be recognized that the process can be carried out continuously.

The peroxide fed to the process does not exceed stoichiometric by more than about 5 percent. The evaporation of water in this process assures the formation of substantially anhydrous particles of the percarbonate in spherical form and having relatively low apparent density.

The single FIGURE shows a flow diagram of one form of apparatus which can be used in carrying out the invention.

This invention is based on the unexpected discovery that it is ill-advised to mix the separate components of the reaction mixture immediately before they are sprayed, despite the general rule that it is preferable to assure an effective mixture of reactants before any reaction, and as recommended by the Degussa publication. It has been found according to the present invention that the separate ingredients, namely the soda (sodium hydroxide in aqueous solution), aqueous hydrogen peroxide solution, and the carbon dioxide gas react with excellent yield when they are separately injected into the reaction vessel. In summary, it has been established according to the present invention that it is not only possible, but even desirable, to prepare sodium percarbonate in situ with a spraying turbine or nozzle by separately injecting the starting materials, the soda in the form of aqueous sodium hydroxide, the active oxygen in the form of hydrogen peroxide, and the carbon dioxide in gaseous form. Both aqueous solutions can be introduced at the top portion of the vessel, and the hot gas can be introduced at the bottom of the vessel or into the top portion of the vessel, or alternatively both solutions and the hot gas can be introduced into the bottom of the vessel.

The temperature of the air fed to the reaction vessel is desirably in the range of 80° to 300° C, and its discharge temperature is desirably between 35° and 120° C. The inlet and discharge temperatures of the carbon dioxide are, respectively, between −20° and 400° C and between 35° and 180° C.

The temperature of the aqueous sodium hydroxide fed to the process is desirably between 10° and 120° C and the initial temperature of the aqueous hydrogen peroxide is desirably between 5° and 50° C. The temperature of the sodium percarbonate product from the reaction vessel is between 20° and 90° C.

According to the present invention, the concentration of the carbon dioxide gas in the inlet air is from 4 to 20 percent. The concentration of the aqueous hydrogen peroxide starting material is from 10 to 70 percent, and the concentration of the sodium hydroxide is from about 10 to about 50 percent. All parts, percentages, proportions and ratios herein are by weight, unless otherwise indicated.

It will be understood from this description that the reactants can also contain other materials. Thus, the starting materials can additionally contain certain adjuvants, particularly, stabilizers for the hydrogen peroxide solution. One material which can be used as a stabilizer is up to about 2 percent sodium acid pyrophosphate. Other stabilizers which can be included are up to 2 percent magnesium sulfate, up to about 0.2 percent of the sodium salt of ethylene diamine tetracetic acid (EDTA), and from 0 to 0.05 percent of orthoxyquinoline sulfate. As a stabilizer for the sodium hydroxide, up to about 1 percent of magnesium silicate can be present.

The process of the present invention can be used to obtain a sized sodium percarbonate product of low apparent density and a high solubility rate. Its apparent density is generally between 0.2 and 1 $g/cm^3$ and its mean particle diameter is between 0.1 and 0.5 mm. The active oxygen content of the sodium carbonate so produced can reach 15.3 percent, and is desirably 7 to 15.3 percent. These properties suit it for use in a wide variety of cleansing and bleaching compositions.

The invention will be further described by reference to the single drawing which schematically represents by way of example one form of apparatus utilized for this process.

The carbon dioxide and air are, respectively, introduced through conduits 10 and 11 into gas preheater 1. They are then directed through duct 13 toward reaction vessel 2, in this case a spray-drying column, where the carbon dioxide-air mixture enters spray-dryer 2 through ports 21. The sodium hydroxide solution is introduced through conduit 22 and the aqueous hydrogen peroxide is introduced through conduit 23 where both streams are atomized by impingement on turbine wheel 24 driven through shaft 25 by a motor (not shown), into spray chamber 2.

The atomized stream formed by the reaction of the sodium hydroxide and hydrogen peroxide in the presence of the carbon dioxide is removed through duct 26 and is immediately separated from the hot carbon dioxide-containing air and from the water vapor by means of cyclone separator 3 where the gases are removed through blower 5 via duct 31 and the solids fall to conduit 32. The solids are then rapidly cooled in fluidized bed 4, where air is blown in through ports 41. The removal of the fluidizing gas is effected by means of additional cyclone 6 and exits through conduit 61. The sodium percarbonate obtained is recovered through takeoff conduit 42.

The atomizing system shown to include turbine wheel 24 in the drawing can equally be one of a variety of such systems known in the art. In addition to the turbine system already mentioned, high pressure spray nozzle injectors and other suitable devices can be used to atomize the liquid streams and permit contact of the sprays so formed and the gases in the reaction vessel. According to variations of the process only part of the hydrogen peroxide is introduced into spray tower 2 and the remainder is introduced into fluidized bed 4 through ports 41, for instance, in the form of a fine mist.

The following examples are given to illustrate embodiments of the invention as it is presently preferred to practice it. It will be understood that these examples are illustrative, and the invention is not to be considered as restricted thereto except as indicated in the appended claims.

EXAMPLE I

Into a 2.5-meter cylindrical spray dryer is introduced 63 kg/hr of an aqueous solution containing 48 percent sodium hydroxide and this solution impinges on a turbine wheel. Onto this same turbine there is impinged 28.7 kg/hr of a 70 percent aqueous hydrogen peroxide solution.

The turbine rotates at 20,000 rpm and this high rotation velocity causes the sodium hydroxide and hydrogen peroxide solution to be injected into the spray dryer without being mixed until they are in the form of spray. The carbon dioxide is mixed with air to provide a 6 percent concentration, is preheated, and enters the spray dryer at a temperature of 140° C and exits at 90° C.

After a mean residence time of 25 seconds in the spray dryer, the product formed is separated from the carbon dioxide-containing hot air and the water vapor in cyclone 3 and cooled rapidly to 20° C in fluidized bed 4. Sodium percarbonate having an active oxygen content of 15.2 percent is obtained at the rate of 59 kg/hr. The particles obtained are in general hollow. Their mean diameter is 100 microns and their apparent density lies between 0.2 and 0.3 g/cm$^3$.

The yield of the process based on active oxygen is greater than 94 percent. The amount of water in the percarbonate so produced is less than 0.5 percent.

EXAMPLE II

Utilizing a different apparatus (not shown herein) which differs from that of Example I in that the input air containing $CO_2$ is introduced at the bottom of the spray tower instead of at the top, and in that the aqueous sodium hydroxide and hydrogen peroxide solutions are atomized by high pressure feed nozzles without the use of a turbine, the process is repeated. The carbonated gas-air mixture containing 6 percent $CO_2$ enters at 140° C and exits at 80° C.

The respective feed rates of the 48 percent aqueous sodium hydroxide and of the 70 percent aqueous hydrogen peroxide are 30 kg/hr and 13 kg/hr. Sodium percarbonate containing 13.65 percent active oxygen is recovered as the effluent from the cooler.

The yield based on the amount of active oxygen is 85 percent. The product so obtained has a mean diameter of 250 microns and an apparent density of 0.5 g/cm$^3$.

EXAMPLE III

Sodium percarbonate is produced according to the process shown in Example II, the process being varied by deliberately limiting the quantity of aqueous hydrogen peroxide feed of the spray dryer to 75 percent of the stoichiometric amount. The remainder of the peroxide is added in the fluidized bed in the form of a fine rain. The total quantity of hydrogen peroxide used is 5 percent in excess of stoichiometric.

The yield of sodium percarbonate, based upon active oxygen, is 92 percent. The product obtained has an active oxygen content of 14.8 percent, a mean diameter of 250 microns, and an apparent density of 0.6 g/cm$^3$.

EXAMPLE IV

This Example, together with Example V, illustrates the undesirability of combining the sodium hydroxide and hydrogen peroxide solutions before their introduction into the spray dryer. The procedure of Example I is followed by permitting the aqueous hydrogen peroxide and sodium hydroxide solutions to contact each other for 2 seconds before they are atomized. The product obtained has a dark yellow color and does not contain more than 0.8 percent active oxygen.

EXAMPLE V

The procedure of Example IV is repeated by permitting the aqueous hydrogen peroxide and sodium hydroxide solutions to contact each other for 0.1 seconds. The product obtained is light yellow, and it does not have more than 7.9 percent active oxygen. A yield, based on active oxygen, of more than 50 percent cannot be obtained.

From the latter two Examples the desirability of preventing admixture of the aqueous hydrogen peroxide and sodium hydroxide solutions will be readily apparent to those skilled in the art.

It can also be seen that the reaction according to the claimed process is very rapid. In general, residence times in the reaction vessel of 20 to 30 seconds can be utilized.

The invention described herein can also be utilized to provide other alkali metal percarbonates when these are desired. Thus, potassium percarbonates can similarly be prepared. It will be understood by those skilled in the art that, since most detergent compositions are based upon sodium salts, sodium is a commercially preferred alkali metal for use in the practice of this invention.

The invention has been described in terms of spray dryers and the like operated at substantially atmospheric pressures, but operation at sub-atmospheric and superatmospheric pressures is also possible. It will be understood by those skilled in the art that pressures greater than atmospheric may require heavier apparatus, as may those at sub-atmospheric pressures. It is accordingly generally preferred to operate the claimed process at atmospheric pressure.

What is claimed is:

1. A process for the production of alkali metal percarbonates which comprises concurrently spraying separate aqueous solutions of sodium or potassium hydroxide and hydrogen peroxide into a reaction vessel and simultaneously introducing into the vessel a hot gas containing air and carbon dioxide to form particles, respectively, of sodium or potassium percarbonate, and recovering the particles.

2. A process according to claim 1 wherein the solutions are sprayed into the top portion of the vessel and the hot gas is introduced at the bottom of the vessel.

3. A process according to claim 1 wherein both the aqueous solutions and the hot gas are introduced into the top portion of the vessel.

4. A process according to claim 1 wherein both the solutions and the gas are introduced into the bottom portion of the vessel.

5. A process according to claim 1 wherein the influent air is at a temperature of from 80° to 300° C and the effluent gas is at a temperature of 35° C to 180° C.

6. A process according to claim 1 wherein the percarbonate particles are rapidly cooled to a temperature of 10° to 30° C.

7. A process according to claim 1 wherein the hot gas contains from about 4 to about 20 percent carbon dioxide.

8. A process according to claim 1 wherein the quantity of hydrogen peroxide is from stoichiometric to about 5 percent in excess of stoichiometric, based on the sodium hydroxide.

9. A process according to claim 1 wherein the concentration of the aqueous sodium hydroxide is from about 10 to about 50 percent and the concentrate of the aqueous hydrogen is from about 10 to about 70 percent.

10. A process according to claim 1 wherein the hydroxide is sodium hydroxide.

* * * * *